UNITED STATES PATENT OFFICE.

KARL SCHNITZSPAHN, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

ORANGE AZO DYE.

959,078.  Specification of Letters Patent.  Patented May 24, 1910.

No Drawing.  Application filed August 4, 1909. Serial No. 511,167.

*To all whom it may concern:*

Be it known that I, KARL SCHNITZSPAHN, doctor of philosophy, chemist, a subject of the German Emperor, and resident of Offenbach-on-the-Main, in the Grand Duchy of Hessen, Germany, with the post-office address Obermainstrasse No. 81, have invented new and useful Improvements in Orange Azo Dyes, of which the following is a specification.

The invention relates to the manufacture of new azo coloring matter by combining the diazo compounds of amins of the general formula:

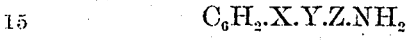

wherein X, Y and Z means H, Cl and $SO_3H$ and wherein at least one of these substituents is a chlorin atom, with beta-naphthylamin-sulfonic acids having the formula:

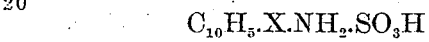

(X meaning H or $HSO_3$).

It is also found that these dyestuffs are very suitable for the manufacture of pigment colors.

These dyestuffs dye very bright orange shades. The dyestuffs obtained from amins containing two or three chlorin atoms, or one or two chlorin atoms and one sulfonic group, show a remarkable fastness against the action of acids and light.

The following examples will serve to illustrate the nature of the invention. The parts are by weight.

Example 1: 128 parts of para-chloroanilin are dissolved in 640 parts of water and 342 parts of hydrochloric acid (20° Bé.) and diazotized with 280 parts of a solution containing 25 per cent. of sodium nitrite. The diazo solution is combined at a temperature of 15° C. with a solution of 360 parts of the neutral sodium salt of 2:3:6-naphthylamindisulfonic acid containing 272 parts of crystallized sodium acetate. After the formation of the dyestuff the mixture is heated up to boiling and the dyestuff precipitated by addition of common salt. The thus obtained coloring matter forms in dry shape an orange-yellow powder, soluble in concentrated sulfuric acid with blue-red color, in water with orange-yellow color, which is not changed by addition of hydrochloric acid or caustic soda lye.

Example 2: 162 parts of 2:5-dichloroanilin are sufficiently ground with 400 parts of hydrochloric acid (20° Bé.) and after addition of 400 parts of ice diazotized with 280 parts of a solution containing 25 per cent. of sodium nitrite. The diazo solution is allowed to flow into a solution of 360 parts of the neutral sodium salt of 2:3:6-naphthylamindisulfonic acid. After the formation of the dyestuff 170 parts of calcined sodium carbonate are added. The mixture is heated up to boiling and the dyestuff precipitated by means of common salt. The thus obtained coloring matter forms in dry shape an orange-yellow powder, soluble in concentrated sulfuric acid with blue-red color, in water with orange-yellow color, which is not changed by addition of hydrochloric acid or caustic soda lye.

Example 3: 264 parts of the sodium salt of 2:5-dichloroanilin-4-sulfonic acid are diazotized in the usual manner with 1200 parts of water, 342 parts of hydrochloric acid (20° Bé.) and 280 parts of a solution containing 25 per cent. of sodium nitrite. The diazo solution is added to a solution containing 360 parts of the neutral sodium salt of 2:3:6-naphthylamindisulfonic acid and 136 parts of crystallized sodium acetate. When the formation of the dyestuff is completed the coloring matter is precipitated by addition of common salt. The dyestuff thus resulting forms an orange yellow powder, soluble in concentrated sulfuric acid with red color, in water with orange-yellow color, which is not changed by addition of hydrochloric acid or caustic soda lye.

Example 4: 162 parts of 2:5 dichloroanilin are diazotized according to the statements given in Example 2. The diazo solution is added to a solution containing 360 parts of the neutral sodium salt of 2:5:7-naphthylamindisulfonic acid and 272 parts of crystallized sodium acetate. After formation of the dyestuff the mixture is heated up and the dyestuff precipitated by means of common salt. The coloring matter resulting forms in dry state an orange yellow powder, soluble in concentrated sulfuric acid with blue-red color, in water with orange-yellow color, which is not changed by addition of hydrochloric acid or caustic soda lye.

Instead of the amins, used in the above mentioned processes, ortho-chloroanilin, 3:4-dichloroanilin, 2:4:5:1-trichloroanilin, monochloroanilinsulfonic acid and 3:4-dichloroanilin sulfonic acid, respectively instead of 2:3:6-naphthylamindisulfonic acid, 2:5:7-naphthylamindisulfonic acid and 2:6- or 2:5-naphthylaminmonosulfonic acid may be used.

Now what I claim and desire to secure by Letters Patent is the following:

1. The process for the manufacture of new monoazodyestuffs, which consists in combining the diazo compounds of amins of the general formula:

$$C_6H_2.X.Y.Z.NH_2$$

wherein X, Y and Z means H, Cl and SO$_3$H, and wherein at least one of these substituents is a chlorin atom, with beta-naphthylaminsulfonic acids of the formula:

$$C_{10}H_5.X.NH_2.SO_3H$$

wherein X means H and SO$_3$H.

2. As new products, the azo coloring matter obtained by combining the diazo compounds of amins of the general formula:

$$C_6H_2.X.Y.Z.NH_2$$

wherein X, Y and Z means H, Cl and SO$_3$H, and wherein at least one of these substituents is a chlorin atom, with beta-naphthylaminsulfonic acids of the formula:

$$C_{10}H_5.X.NH_2.SO_3H$$

wherein X means H and SO$_3$H, which in the shape of its alkaline salt is an orange-yellow powder, soluble in water with orange-yellow color, in concentrated sulfuric acid with yellowish to bluish Bordeaux red color.

3. The process for the manufacture of new monoazocoloring matter, which consists in combining the diazo compounds of amins of the general formula:

$$C_6H_2.X.Y.Z.NH_2$$

wherein X, Y and Z means H, Cl and SO$_3$H, and wherein at least one of these substituents is a chlorin atom, with 2-naphthylamin-3:6-disulfonic acid.

4. As a new article of manufacture the coloring matter obtained by combining the diazo compounds of amins having the general formula:

$$C_6H_2.X.Y.Z.NH_2$$

wherein X, Y and Z means H, Cl and SO$_3$H, and wherein at least one of these substituents is a chlorin atom, with 2-naphthylamin-3:6-disulfonic acid, which coloring matter is in the shape of its alkaline salt an orange yellow powder, soluble in concentrated sulfuric acid with Bordeaux-red to violet color, in water with orange-yellow color, which is not changed by addition of hydrochloric acid or caustic soda lye.

5. The process for the manufacture of new monoazodyestuffs which consists in combining dichloroanilin with 2-naphthylamin-3:6-disulfonic acid.

6. As new products the dyestuffs obtained by combining dichloroanilin with 2-naphthylamin-3:6-disulfonic acid, which are in shape of their alkaline salts orange-yellow powders soluble in concentrated sulfuric acid with blue-red color, in water with orange-yellow color, which is not changed by addition of hydrochloric acid or caustic soda lye.

7. The process of manufacturing new monoazo coloring matter, which consists in combining 2:5-dichloro-anilin with 2-naphthylamin-3:6-disulfonic acid.

8. As a new product the dyestuff obtained by combining 2:5-dichloro-anilin with 2-naphthylamin-3:6-disulfonic acid, which dyestuff is in the shape of its alkaline salt an orange-yellow powder, soluble in concentrated sulfuric acid with blue-red color, in water with orange-yellow color, which is not changed by addition of hydrochloric acid or caustic soda lye.

In testimony, that I claim the foregoing as my invention, I have signed my name in presence of two witnesses, this 26th day of July 1909.

KARL SCHNITZSPAHN.

Witnesses:
 JEAN GRUND,
 CARL GRUND.